(No Model.) 2 Sheets—Sheet 1.

W. G. FLANDERS.
COFFEE FILTER.

No. 308,661. Patented Dec. 2, 1884.

Witnesses:
W. H. Hollister Jr.
John T. Booth

Inventor.
Wm. G. Flanders
by Geo. A. Mosher
Atty.

(No Model.) 2 Sheets—Sheet 2.

W. G. FLANDERS.
COFFEE FILTER.

No. 308,661. Patented Dec. 2, 1884.

Witnesses:
W. M. Hollister Jr.
John T. Booth

Inventor
Wm. G. Flanders
by Geo. A. Mosher
Atty.

UNITED STATES PATENT OFFICE.

WILLIAM G. FLANDERS, OF NEW YORK, N. Y.

COFFEE-FILTER.

SPECIFICATION forming part of Letters Patent No. 308,661, dated December 2, 1884.

Application filed November 22, 1883. (No model.)

*To all whom it may concern:*

Be it known that I, WILLIAM G. FLANDERS, a resident of New York city, in the county of New York and State of New York, have invented certain new and useful Improvements in Coffee-Filters; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in coffee-filters; and it consists in providing a plurality of cloth strainers, and in the novel construction and arrangement of parts, as hereinafter described.

The object of my invention is to provide a coffee-filter that will separate the coffee-grounds from the infusion or liquid to prevent clogging of the filter, and to provide a means of easy access to the different parts of the filter for the purpose of cleansing the same.

Figure 1:
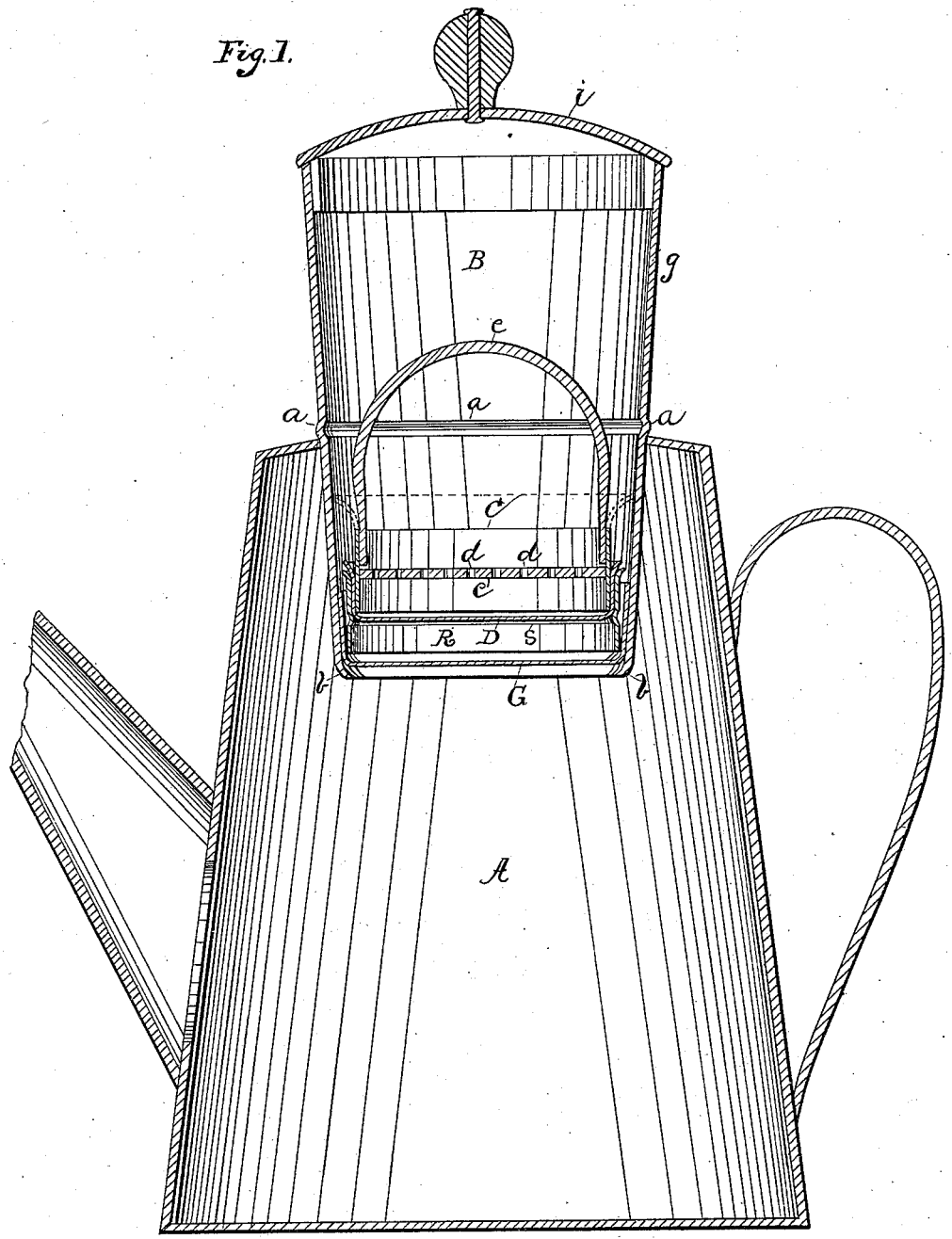
Figure 2:
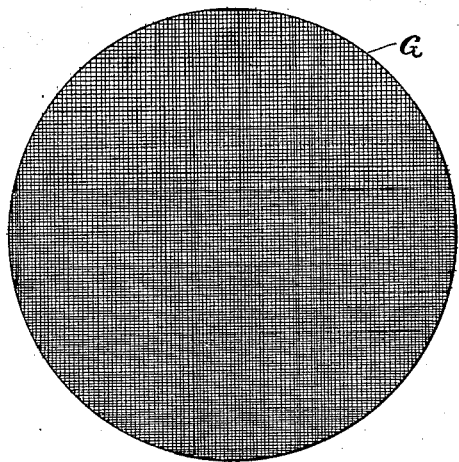
Figure 3:
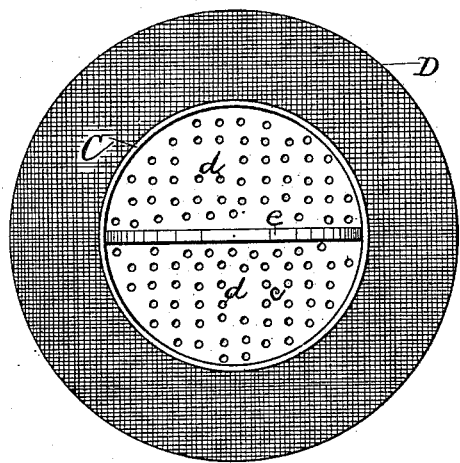
Figure 4:
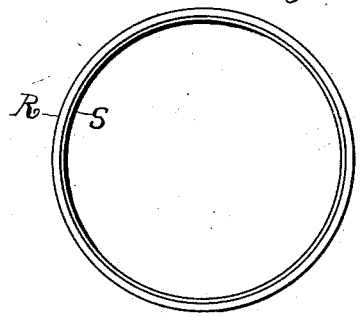
Figure 6:
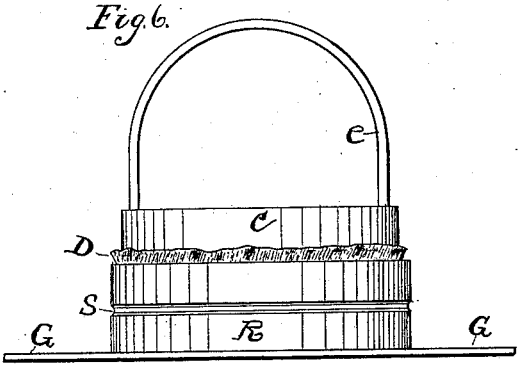
Figure 5:
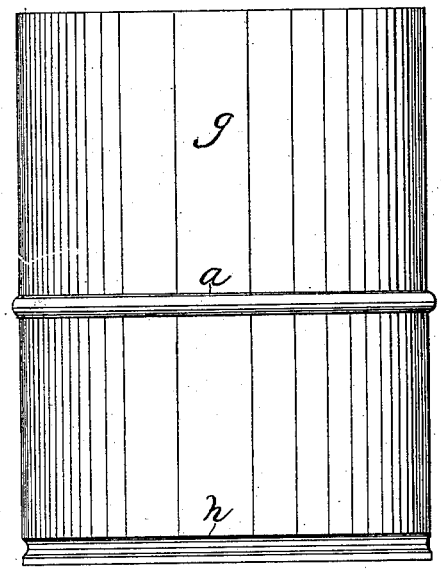

Figure 1 is a central vertical section of my improved filter and coffee-pot, the former being inserted in the top opening of the latter. Fig. 2 is a plan view of a cloth strainer. Fig. 3 is a plan view of a metallic strainer resting upon a cloth strainer. Fig. 4 is a plan view of a binding and supporting ring. Fig. 5 is a vertical view of filter-case. Fig. 6 is a side elevation of the filter-strainers and supports.

A represents a coffee-pot, and B one of my improved filters, partly in section.

$c$ is a metallic strainer with perforations $d$, suspended within and permanently secured to the ring C, the latter being provided with a handle, $e$, by which the ring and strainer can be easily inserted within or withdrawn from the case $g$.

D is a strainer made of some coarse fabric, as muslin, circular in form, and large enough to overlap the ring C, as shown in Figs. 1 and 3.

R is a ring, which may have an inwardly-projecting bead, S, forming a shoulder to support the smaller ring C, when the latter is inserted in the former, as shown.

G is a strainer, similar in form to that of strainer D, made of closely-woven fabric, as linsey-woolsey, and somewhat larger in diameter than ring R, as shown in Fig. 6.

The parts are arranged for use as follows: The strainer D is laid upon the metallic strainer-ring C, as shown in Fig. 3, except that it is more convenient to invert the position of the parts so that handle $e$ will project downward and the cloth strainer will cover the outlet of ring C. The ring R is then slipped on over the cloth and ring until the parts occupy the position relative to each other, (shown in Figs. 1 and 6,) though still inverted. Then place the other cloth strainer, G, over the outlet of ring R in the relative position shown in Fig. 6. Then slip the case $g$ on over all the parts shown in Fig. 6, turn them right side up, and they will occupy the relative position shown in Fig. 1. The handle $e$ is used to insert the parts within the case $g$, and to remove them again when and as often as desired. It will thus be seen that the parts are easily adjusted and readjusted for use or cleaning.

In filtering coffee fine coffee-grounds are deposited upon the metallic strainer $c$ and hot water poured thereon. The water passes down through the strainer $c$ and carries with it to the first cloth strainer, D, many of the particles of coffee-grounds, where all except the finest are retained. The latter pass on to the next and more closely-woven strainer, G, where they are deposited and remain on its surface. The water is thus made to filter through all the coffee-grounds and falls into the coffee-pot a clear infusion entirely free from coffee-grounds or vegetable matter.

By employing two or more cloth strainers differing as above described they are prevented from clogging so quickly, and the infusion is perfectly clarified, while the parts are easily separated into forms convenient for cleaning. The filter is entirely distinct from the coffee-pot, and may be used with coffee-urns or other receptacles. The case $g$ may be frusto-conical in shape, as shown in Fig. 1, or plane cylindrical, as shown in Fig. 5.

By the expression "cloth strainer" I intend to include any fibrous fabric, whether woven, knit, or interlaced.

The case $g$ may have any suitable cover, $i$.

The strainer-rim C may have its upper edge expanded to fill the interior of the case $g$, as shown by dotted lines in Fig. 1. The upper edge of ring R may be similarly expanded, as shown in Fig. 1.

I am aware of Patents No. 227,251, No. 134,514, and No. 134,515, and I do not claim, broadly, such devices as are shown in said patents, as the details of construction in my invention differ therefrom.

What I claim as new, and desire to secure by Letters Patent, is—

In a supporting filter-case, the detachable strainer $c$, having perforations, and provided with the sustaining-ring C and handle $e$, in combination with the casing $g$, strainer D, adapted to fit over the ring C, the ring R, having an annular groove, S, and strainer G, the whole being adapted to be withdrawn from the casing, all substantially as shown, and for the purposes described.

In testimony whereof I have hereunto set my hand this 19th day of November, 1883.

WILLIAM G. FLANDERS.

Witnesses:
FRED P. SMITH,
HERBERT G. RHODES.